United States Patent [19]

Lindorfer et al.

[11] Patent Number: 4,577,999

[45] Date of Patent: Mar. 25, 1986

[54] PROCESS FOR STORING LIQUID WASTE IN SALT CAVITIES

[75] Inventors: Walter Lindorfer, Kassel; Wilhelm Jahn-Held, Staufenberg; Lutz J. Gerschler, Diekholzen; Berthold Jandel, Hildesheim; Friedel Wartenpfuhl, Giesen, all of Fed. Rep. of Germany

[73] Assignee: Wintershall AG, Kassel, Fed. Rep. of Germany

[21] Appl. No.: 553,143

[22] Filed: Nov. 18, 1983

[30] Foreign Application Priority Data

Nov. 25, 1982 [DE] Fed. Rep. of Germany ....... 3243594

[51] Int. Cl.$^4$ .............................................. B65G 15/00
[52] U.S. Cl. ....................................... 405/53; 405/59; 405/128
[58] Field of Search ................... 405/53, 52, 128, 129, 405/54–59

[56] References Cited

U.S. PATENT DOCUMENTS

| 3,491,540 | 1/1970 | Lennemann | 405/53 |
| 3,914,945 | 10/1975 | Bietlot | 405/53 |
| 4,435,290 | 3/1984 | Lindorfer et al. | 405/53 X |

*Primary Examiner*—Dennis L. Taylor
*Attorney, Agent, or Firm*—Michael N. Meller

[57] ABSTRACT

A liquid waste with a pH of 7 or more, which has been adjusted above ground if necessary, is treated above ground to produce a pumpable mixture, which has a boiling point above 85° C.,
flash point above 65° C.,
vapor pressure at 60° C. of up to 0.5 kp/cm$^2$, and
viscosity of less than 300 cP
and which forms no toxic or flammable gases. The mixture is then conveyed to a salt cavity and allowed to stand until phase separation has occurred before the resulting liquid phases are separately drawn off for further treatment or disposal.

13 Claims, No Drawings

PROCESS FOR STORING LIQUID WASTE IN SALT CAVITIES

BACKGROUND OF THE INVENTION

The increase in the world population and consequent increase in industrial capacity has created the important problem of disposing of the resulting and ever-increasing quantities of waste without disturbing the existing ecological balance.

It is a well known practice to store solid waste in gas- and water-tight containers underground, as for example in abandoned salt mines. Liquid waste can only be disposed of in this way, if it has been solidified beforehand using appropriate means.

Storing waste materials, for example salt residues from the treatment of mined crude potash salts, in heaps and piles above ground is also known. However, considerable technical complexity is involved in sealing off the subsoil and collecting and diverting the surface water to prevent salinization of the soil and ground water. In order to keep the area of such heaps and piles from becoming literally mountains, German patent application No. 26 14 238 published Oct. 13, 1977 outlines a process for piles of bulk materials, particularly residues from the treatment of crude potash salts, by which it is possible to produce such piles of great height over a relatively small area.

Using other well-known processes, liquid waste, particularly waste lye from treatment of crude potash salts, can be injected into the absorbent deeper rock strata, for example, sandstone or sheet dolomite. However, this requires high injection pressures and, consequently, considerable energy. Moreover, the available capacity at any given time cannot be checked directly.

Another method of disposal is ocean incineration, particularly of those materials containing halogens, so that the resulting hydrogen halides are absorbed by the sea water and bound by its carbonate component with the liberation of carbon dioxide. It is also common to dump acidic liquid waste, such as dilute acid in the ocean. Over prolonged periods, these processes dispose of waste, but alter negatively the existing ecological and biological balance of the ocean.

According to German patent application No. 22 25 664, published Dec. 6, 1973, liquid radioactive waste or solid radioactive waste with good flow properties is mixed above ground with cement or bitumen to yield a slurry which is fed into underground cavities where it solidifies. As a result of their radioactivity, these wastes require a large number of added substances in order to dilute the radioactive waste, to a large extent, in addition to causing solidification. This means that a large volume of space is required for storage of a small quantity of waste.

German Patent No. 25 49 313 published May 5, 1977, describes a process in which liquids stored in underground cavities are recovered with a mixture of styrene, cyclohexanol peroxide, and cobalt accelerator, which hardens to produce a coating which prevents possible release of gases from the stored liquid. However, this does not exclude the possibility of a reaction between the stored liquids and the salt of the cavity wall, thereby generating gases which ultimately rupture the coating.

The problem then was to find a method of storing liquid waste in the cavities produced in natural salt deposits by solution mining, hereafter referred to as the storage area, without gases being produced due to the waste material reacting with the salt in the deposit.

SUMMARY OF THE INVENTION

A process was found for storing liquid waste in cavities, especially caverns produced in natural salt deposits by solution mining. In this process, the liquid waste with a pH of 7 or more is blended with additional materials as required to produce a pumpable mixture which has a boiling point above 85° C.,
flash point above 65° C.,
vapor pressure at 60° C. of up to 0.5 kp/cm$^2$,
viscosity of less than 300 cP and which forms no toxic or flammable gases. The mixture is then fed into a cavity especially a cavern, produced by solution mining and, after separation of the deposited mixture into a heavier and a lighter liquid phase, both phases are separately pumped out of the cavity or cavern, whereupon a further corresponding volume of the pumpable mixture is fed into the area in the cavity or cavern, which has become empty.

DETAILED DESCRIPTION

According to the invention, the liquid waste to be used in the process, preferably one from the chemical industry, crude oil refining, petrochemistry, coal upgrading, plastics production and processing and water treatment, is blended above ground with additional materials as required to produce a pumpable mixture, whose characteristics conform to the required limits and which do not form any toxic or flammable gases. Liquid waste with a pH of 7 or more, for example used oils, oil emulsions, oil sludges, contaminated salt solutions, red mud from aluminum production and the like, can be directly used in the process. Liquid waste with a pH of less than 7, for example dilute acid, residues from the production of organic halogen compounds and the like or their mixtures are advantageously adjusted above ground to a pH of 7 or more, employing alkaline substances. In this case, it can be advantageous to add the alkaline substances to the liquid waste in quantities adequate to produce complete precipitation of any heavy metals dissolved in the liquid waste.

Calcium hydroxide, preferably in the form of milk of lime or dolomite powder, has proved to be as successful in raising the pH as the alkaline wastes obtained, for example, in the surface treatment of metals through pickling or etching and in electro-plating works. Because the waste or its mixtures have a pH of 7 or more, they do not react with the salts, preferably rock salt, surrounding the storage area and, in particular, release no hydrogen chloride gas in the storage area. The practice of adjusting the pH of acidic waste above ground also has the advantage that any resulting gases or water vapor can be removed from the apparatus more easily and at much less cost than from an underground storage area. The heat of neutralization, which may be liberated when adjusting the pH, can reduce the viscosity of the resulting mixture, thus improving the stirring and pumping characteristics and reducing the required energy. If necessary, this heat of neutralization can also be used for warming the liquid waste or pumpable mixture if highly volatile components are to be driven off above ground. However, the liquid waste or resulting pumpable mixture can also be heated using other well-known methods, acting either alone or in conjunction with the heat of neutralization which may be liberated.

The difficulty soluble compounds which may precipitate out when adjusting the pH of the liquid waste do not hinder the process according to the invention if these precipitates remain suspended or can be retained in the liquid phase. Analogously, the same applies to fine solid wastes or waste salts which, according to the invention, can be added to the neutral or alkaline mixture. Preferably contaminated crystallizates, ashes, slag, dust, solid residues and residues of roasting as well as plastics waste and resins, can be used as fine solid waste substances after previous comminution, if necessary. These finely divided solid waste substances can also be used in the form of sludges and pastes. In any case, the result must be a pumpable mixture, which has the previously stated characteristics.

The thus obtained mixtures are then fed into the underground storage area using a pump and downpipe, and initially left to settle. These mixtures also do not react with the salts of the deposit which are at a higher temperature than that aboveground, so that gas evolution, which generally accompanies such reactions, does not occur.

After being allowed to stand in the storage area, the mixture separates into a heavier, generally aqueous liquid phase in which any solids which may be present sink to the bottom, and into a lighter liquid phase generally consisting of organic liquids.

According to the invention, these two liquid phases are separately drawn out of the storage area after phase separation has been completed. A further corresponding volume of the pumpable mixture is then fed into the thus emptied storage area and allowed to stand until phase separation has occurred and the two liquid phases are then separately drawn out of the storage area. This procedure is then repeated until the storage area is almost full. The lighter liquid phase is then pumped out of the storage area. Such lighter phase consists of organic liquids and can be subjected to further treatment to produce commercially valuable products.

During the time in which the aqueous phase is in the storage area, it becomes saturated with salts from the deposit, predominantly rock salt. This accelerates and improves phase separation. This aqueous phase can be pumped out of the storage area down to a level equal to that of any solids which may have settled, and then advantageously discharged into the sea without any damage.

The process according to the invention renders it possible to store liquid waste in underground areas without any reaction of the waste material with the salt in the deposit generating gases which could corrode the metallic components in the feeding systems leading to the storage areas. It also provides a technically advantageous way of separating liquid organic components from such wastes without considerable expense and then passing them on for further treatment. The remaining aqueous phase can easily be separated from any solids which may have settled out, and then harmlessly disposed of by discharge into the sea.

The process according to the invention is illustrated by the following examples:

EXAMPLE 1

A "dilute acid" containing 5% $H_2SO_4$, 5% $FeSO_4$ and having a density of 1.1 g/cm$^2$, has the following characteristics which meet the requirements of the process of the invention:
boiling point 115° C.,
no flash point,
vapor pressure at 60° C. of 0.22 kg/cm$^2$,
viscosity at 20° C. of less than 10 cP,
no release of gases at 65° C.,
No reaction with air.

This acidic, liquid waste is neutralized above ground to a pH above 7 using milk of lime obtained by suspending 10% burnt lime in water. For this purpose, 100 l dilute acid reacts with 35 kg milk of lime (corresponding to 3.5 kg CaO).

A further quantity of 100 l dilute acid is neutralized with stirring using 42 kg of diaphragm-cell caustic liquor with a density of 1.23 and containing 11% by weight NaOH and 16% by weight NaCl. The heavy-metal content (Fe) of the dilute acid is precipitated out as hydroxide using 22.4 kg of milk of lime or 27.1 kg of the diaphragm-cell caustic liquor. The resulting liquid mixture is then pumped into a model salt cavern consisting of a metal vessel containing solid pieces of rock salt and then maintained at a temperature of 60° C. in this container by applying external heat. There is no metal corrosion and no reaction with the rock salt forming hydrogen chloride.

After separation, the aqueous phase lying above the settled solids is pumped out as a liquid practically free of heavy metals, thus creating free space in the cavity for storage of further quantities of waste.

EXAMPLE 2

A chemicals industry waste mixture comprising chlorinated hydrocarbons and having a density of 1.126 and containing 5% by weight water and 5% by weight solids has a flash point of 32.5° C. and, consequently, does not meet the requirements of the process according to the invention. In order to adjust the flash point to the required value, 10% by weight of a solvent boiling in the 50° C.–70° C. range is separated from the mixture.

After this preliminary treatment, the liquid waste mixture has the following characteristics:
boiling point: can only be distilled under vacuum, consequently, "above 85° C.",
flash point: above 65° C.,
vapor pressure at 60° C. of 0.22 kg/cm$^2$,
viscosity at 20° C. of 180 cP (1.8 dPas),
no release of gases at 65° C.,
no toxic or flammable gases.

In its aqueous phase, this waste mixture has a pH of 0.2 and, after stirring with water, a pH of 1.9 after 24 hours. 1 m$^3$ of this waste with a water content of 56.3 kg is stirred above ground with 10.5 kg of 10% aqueous milk of lime obtained from burnt lime (95% CaO). Another 1 m$^3$ is stirred with 18.8 kg of a 10% aqueous solution of waste sods ($Na_2CO_3$).

However, this quantity of neutralizing agent is not sufficient to neutralize the acidity from the 5% solids content. For this reason, each 1 m$^3$ is also treated with 63 g 10% of milk of lime or 0.36 l 10% soda solution to achieve complete neutralization.

After neutralization, this waste has a viscosity of 370 cP at 20° C. In order to achieve the characteristics required according to the process of the invention, a temperature of 30° C. is maintained in the liquid phase using the heat of neutralization and applying heat externally. At a temperature of 30° C., the viscosity is then 270 cP, thus providing practical, utilizable pumping characteristics so that it can be fed into the cavity produced by solution mining. The mixture is subsequently pumped into the model metal vessel containing rock salt lumps. There is no corrosion of the vessel walls and no reaction with the rock salt.

EXAMPLE 3

A used oil contaminated with heavy metals and which cannot be burnt to utilize its energy content, has a density of between 0.866 and 0.911 g/cm$^3$. It has a pH lying between 5.3 and 9.4 and the following characteristics:
boiling point: above 85° C.,
flash point: above 65° C.,
vapor pressure: 0.20–0.24 kg/cm$^2$ at 60° C.,
viscosity: 10–220 cP at 20° C.,
no release of gases at 60° C.,
no toxic or flammable gases.

A volume of 1 m$^3$ with a pH of 5.3 is neutralized above ground with 1.5 kg 10% milk of lime whilst stirring and subsequently pumped into the container with rock salt lumps representing a cavity produced by solution mining.

Instead of milk of lime, a further 1 m$^3$ with a pH of 9.4 can be used as the neutralizing agent according to the process of the invention. When adjusting the pH to 7.0 or more, this quantity corresponds to a neutralizing equivalent of 246 g of a 5% acid solution in the form of $H_2SO_4$.

If the water content of this used oil is 20%, or adjusted to such by mixing, then 2.050 kg of this water-containing used oil neutralizes 100 g 5% $H_2SO_4$ solution. On pumping this waste material as a neutralized or neutral/alkaline mixture into the vessel containing rock salt lumps representing the cavity underground, there is no corrosion of the container wall and no reaction with the lumps of rock salt.

EXAMPLE 4

Oil emulsions from the metal-processing industry and from degreasing workpieces have a water content of approximately 80 to 96%. The pH lies between 7.0 and 9.1. Consequently, the alkalinity of these emulsions can be used as a neutralizing agent according to the process of the invention. These wastes have a density of 0.962 to 1.002 g/cm$^3$ at 20° C. and have the following characteristics:
boiling point: above 100° C.,
flash point: above 65° C.,
vapor pressure: 0.20 kp/cm$^3$ at 60° C.,
viscosity: less than 10 cP at 20° C.,
no release of gases at 60° C.,
no toxic or flammable gases.

Such oil emulsions with a pH of 7.0 represent a limiting value according to the process of the invention because the pH does not need to be adjusted here. However, compliance with the requirements of the process according to the invention is a precondition for selection of this waste material.

A quantity of the oil emulsion has a pH of 9.1 at a water content of 90%. This is used as an alkaline material and can be used in the process of the invention for neutralizing acidic wastes. 100 g of a 5% $H_2SO_4$ solution in the form of waste acid is neutralized with 900 l of this oil emulsion. In practice, an acidic waste corresponding to the equivalent of this quantity of acid, is added to the oil emulsion to be stored in order to utilize its alkalinity.

EXAMPLE 5

Oil sludges as wastes consist of used oils with various quantities of water and solids, such as pieces of metal and sand. This waste originates from storage tanks, workshops, purification plants as well as from oil refineries and metal processing. On account of its high water content, incineration of such waste is generally only possible with a support fire which, however, allows metals to enter the atmosphere. If such waste is to be stored above ground after phase separation, a sludge of high water content must first be solidified. Such a solidification requires the use of considerable quantities of inert materials.

Such oil sludges from different sources have a water content of between 35 and 94% and densities range from 0.888 to 1.295 g/cm$^3$. The pH of such waste lies between 6.8 and 8.45 and generally displays low alkalinity which can be utilized when neutralizing acidic waste. Such waste mixtures have the following characteristics:
boiling point: above 100° C.,
flash point: above 65° C., i.e. not provable,
vapor pressure: 0.21–0.24 kp/cm$^2$ at 60° C.,
viscosity: less than 10–130 cP at 20° C., in individual cases up to 600 cP at 20° C.

If the viscosity is above the limiting value required by the process of the invention, this value must be adjusted by mixing with other waste materials with a lower viscosity or also by heating up the mixture using the heat of utilization or externally applying heat by well-known methods. This waste releases no gases at 60° C. and no toxic or flammable gases are generated.

In order to utilize the neutralization equivalent, 4000 l of oil sludge is required per 100 g of a 5% acid solution in form of $H_2SO_4$. This neutralization equivalent may be calculated for other acidic wastes by those skilled in the art.

In the "salt cavity" according to the model, salinization of the aqueous phase occurs during the rest period from the rock salt of the cavern wall, represented by the rock salt pieces. The gradual increase in the density of the aqueous phase to approximately 1.3 g/cm$^3$ leads to a quicker separation of the lighter oil phase from the heavier aqueous phase. After 30 days, the heavier aqueous phase is pumped out from just above the solid sediment to just below the oil phase, thus leaving free about 30% of the total volume for storage of further quantities of waste. The storage of further batches is carried out in a similar way according to the process of the invention.

EXAMPLE 6

In order to attain the selected characteristics according to the process of the invention, the viscosity of the waste can be adjusted in a preliminary treatment stage. A waste comprising a brown, viscous mass containing butanediol and having a pH of 12.3 can be used as an alkaline substance in the process of the invention. At 20° C., the viscosity is greater than 40,000 dPas and it still amounts to 18,000 cP at 50° C. and 8000 cP at 80° C.

In order to produce a pumpable liquid waste mixture for introduction into the underground salt cavity, this waste is mixed with other wastes containing used oils with a viscosity of 20–50 cP at 20° C. The viscosity of the waste can also, or additionally, be reduced by the application of external heat or through indirect heating with superheated steam in heating tubes. The viscosity can also be reduced to values below the limiting value according to the process of the invention by the addition of solvents satisfying the requirements of the process according to the invention. The adjustment parameters for this waste to comply with the viscosity characteristics necessary for the process according to the invention can be determined in simple preliminary experiments. 1000 l butanediol requires 20.0 mole H+ ions, corresponding to 0.98 kg 100% $H_2SO_4$ or 1.25 kg 80% $H_2SO_4$. To utilize the neutralization equivalent, 50 l of the butanediol waste is used per 1 kg 5% $H_2SO_4$ solution or the equivalent acid quantity of another waste.

EXAMPLE 7

When selecting the wastes to be treated and stored using the process according to the invention, those wastes must be avoided which, on reaction, lead to the production of gases which may be released.

Such substances include $CR^{VI}$ compounds, which have a high oxidation potential with respect to other substances. They also include cyanogen compounds, nitrites, nitrates, sulphides, sulphites and solvents. These wastes can lead to the production of gases containing cyanogen and nitrogen oxide which, on account of their corrosiveness, toxicity or flammability, preclude such wastes from use in the process according to the invention.

Since in practice such substances only occur in small quantities, this does not restrict the range of pumpable liquid or solid-liquid wastes which can be treated and stored using the process according to the invention.

However, for operational safety reasons, explosive wastes are also excluded from the process according to the invention.

While there has been described in the above examples the principles of this invention, it is to be clearly understood that the examples and the foregoing description is not to be interpreted as a limitation to the scope of the invention as set forth and is to be limited merely by the subsequent claims.

We claim:

1. A process for storing liquid waste in a salt cavity said process comprising the steps of treating the liquid waste above ground to produce a pumpable mixture with a pH of 7 or more, which has a
   boiling point above 85° C.,
   flash point above 65° C.,
   vapor pressure at 60° C. of up to 0.5 kp/cm$^2$ and
   viscosity of less than 300 cP
and which forms no toxic or flammable gases; conveying said mixture to the salt cavity; allowing the mixture to stand until separation of the mixture into a heavier and a lighter liquid phase occurs; separately pumping both phases out of the cavity, and feeding in a further corresponding volume of the pumpable mixture into the cavity.

2. The process as in claim 1, wherein the liquid waste has a pH of less than 7 and alkaline substances are added to the mixture above ground to adjust the pH to 7 or more.

3. The process according to claim 2, wherein the alkaline substances are added to the liquid waste in quantities which are adequate for complete precipitation of heavy metals dissolved in the liquid waste.

4. The process according to claim 2, wherein the alkaline substances are selected from the group consisting of calcium hydroxide, limestone powder and dolomite powder.

5. The process according to claim 3, wherein the alkaline substances are selected from the group consisting of calcium hydroxide, limestone powder and dolomite powder.

6. The process accordingto claim 2, wherein alkaline wastes are mixed with the liquid waste to adjust the pH.

7. The process according to claim 3, wherein alkaline wastes are mixed with the liquid waste to adjust the pH.

8. The process according to claim 5, wherein the alkaline wastes are obtained in the surface treatment of metals by pickling or etching or from electroplating works.

9. The process according to claim 1, wherein finely divided solid waste materials are mixed with the pumpable mixture without impairing the pumpability of the resulting mixture.

10. The process according to claim 1, wherein the pumpable mixture is heated above ground in order to drive off readily volatile components.

11. The process according to claim 1, wherein the lighter liquid phase pumped from the salt cavern is subjected to further treatment.

12. The process according to claim 1 wherein the aqueous phase is drawn off down to the level of solids which may have settled therein and is then discharged into the sea.

13. The process according to claim 11, wherein the aqueous phase is drawn off down to the level of solids which may have settled therein and is then discharged into the sea.

* * * * *